(12) United States Patent
Henry et al.

(10) Patent No.: US 8,069,339 B2
(45) Date of Patent: Nov. 29, 2011

(54) MICROPROCESSOR WITH MICROINSTRUCTION-SPECIFIABLE NON-ARCHITECTURAL CONDITION CODE FLAG REGISTER

(75) Inventors: G. Glenn Henry, Austin, TX (US); Terry Parks, Austin, TX (US); Gerard M. Col, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 247 days.

(21) Appl. No.: 12/469,430

(22) Filed: May 20, 2009

(65) Prior Publication Data

US 2010/0299504 A1    Nov. 25, 2010

(51) Int. Cl.
G06F 7/38      (2006.01)
G06F 9/00      (2006.01)
G06F 9/44      (2006.01)
G06F 15/00     (2006.01)

(52) U.S. Cl. .................................... 712/235; 712/236
(58) Field of Classification Search .................. None
See application file for complete search history.

(56) References Cited

U.S. PATENT DOCUMENTS

| | | | | |
|---|---|---|---|---|
| 5,440,702 A * | 8/1995 | Brewer et al. | ................. | 712/223 |
| 5,551,051 A * | 8/1996 | Silverthorn et al. | .......... | 718/107 |
| 6,629,235 B1 * | 9/2003 | Flachs et al. | .................. | 712/226 |
| 6,684,323 B2 * | 1/2004 | Soni | .............................. | 712/226 |
| 2002/0194458 A1 * | 12/2002 | Soni | .............................. | 712/227 |

* cited by examiner

*Primary Examiner* — Corey S Faherty
(74) *Attorney, Agent, or Firm* — E. Alan Davis; James W. Huffman

(57) ABSTRACT

A microprocessor includes an architectural register and a non-architectural register, each having a plurality of condition code flags. A first instruction of the microarchitectural instruction set of the microprocessor instructs the microprocessor to update the plurality of condition code flags based on a result of the first instruction. The first instruction includes a field for indicating whether to update the plurality of condition code flags of the architectural or non-architectural register. A second instruction of the microarchitectural instruction set instructs the microprocessor to conditionally perform an operation based on one of the plurality of condition code flags. The second instruction includes a field for indicating whether to use the one of the plurality of condition code flags of the architectural or non-architectural register to determine whether to perform the operation.

22 Claims, 4 Drawing Sheets

GFLAGS                                                                 ⟋—122

| 5 | 4 | 3 | 2 | 1 | 0 |
|---|---|---|---|---|---|
| OF 414 | SF 412 | ZF 408 | AF 406 | PF 404 | CF 402 |

MICROPROCESSOR WITH MICROINSTRUCTION-SPECIFIABLE NON-ARCHITECTURAL CONDITION CODE FLAG REGISTER

FIELD OF THE INVENTION

The present invention relates in general to the field of conditional instructions in microprocessors, and particularly to condition code flags used thereby.

BACKGROUND OF THE INVENTION

Typically microprocessors include an architecturally visible register that includes condition code flags that are used by conditional instructions, such as a conditional branch instruction or a conditional move instruction. For example, in the x86 instruction set architecture, the EFLAGS register contains the Carry Flag (CF), Parity Flag (PF), Auxiliary Carry Flag (AF), Zero Flag (ZF), Sign Flag (SF), and Overflow Flag (OF), which are condition code flags that may be used by conditional instructions, and which are well-defined on pages 3-20 to 3-23 of the IA-32 Intel Architecture Software Developer's Manual, Volume 1: Basic Architecture, June 2006, which are hereby incorporated by reference in their entirety for all purposes. Examples of conditional instructions in the x86 architecture include the Jump If Condition Is Met (Jcc) instruction, the Conditional Move (CMOVcc) instruction, the Floating Point Conditional Move (FCMOVcc) instruction, the LOOPZ and LOOPNZ instructions, or the Set Byte on Condition (SETcc) instruction. Other instructions, i.e., an instruction earlier in program sequence to the conditional instruction, perform an arithmetic or logical operation to generate a result, and the microprocessor updates the condition code flags in the EFLAGS register based on the result. For example, a program may include a sequence of instructions that includes an ADD instruction followed later in the program by a JNZ instruction. The instruction set architecture specifies that the microprocessor updates the condition code flags in the EFLAGS register based on the result of the ADD instruction. For example, if the result of the ADD is zero, the microprocessor will set the ZF flag in the EFLAGS register. The JNZ instruction specifies a target address to which the microprocessor will jump if the ZF flag in the EFLAGS register is clear (i.e., not zero); otherwise, the microprocessor will fetch the next sequential instruction after the JNZ instruction.

Another feature of some modern microprocessors is that they include a microarchitecture that is different from the instruction set architecture, or architecture (also sometimes referred to as the macroarchitecture), of the microprocessor. This is typical of x86 architecture microprocessors. The architecture specifies the instruction set, register set, set of exceptions, and so forth that are visible to the assembly language programmer or compiler writer for the microprocessor. On the other hand, the microarchitecture specifies the internal organization of the microprocessor and includes details that are not visible in the architecture. For example, the microarchitecture specifies the various functional units of the microprocessor and their arrangement; whether the microprocessor is pipelined or non-pipelined, is scalar or superscalar, performs out-of-order execution, or performs speculative execution such as due to branch prediction and/or load hit prediction; the size and arrangement of cache memories; and so forth. Two different microprocessors may have the same architecture, yet have significantly different microarchitectures. In particular, in microprocessors that include microcode, the microarchitecture specifies its own instruction set that is different from the architecture instruction set and is typically not visible to the programmer. The instruction set of the microarchitecture is the set of instructions that the functional units of the microprocessor actually execute. The instructions of the architecture instruction set may be very complex and may be variable length. In contrast, the instructions of the microarchitecture instruction set typically are simpler than the instructions of the architecture instruction set, and popularly conform to the reduced instruction set computer (RISC) load-store and fixed instruction length paradigms. Furthermore, the number of registers of the microarchitecture register set is typically greater than the number of registers available in the architecture register set. For example, the microarchitecture may perform register renaming with its larger register set to improve performance.

Microprocessors that have distinct architectural and microarchitectural instruction sets include an instruction translator that translates architectural instructions (also referred to as macroinstructions) into instructions of the microarchitecture (microinstructions) that are dispatched to the execution units to be executed. Additionally, such microprocessors typically include microcode that implements some of the macroinstructions. The microcode is routines, or sequences, of microinstructions of the microarchitecture instruction set stored in a microcode memory of the microprocessor. When the instruction translator encounters a macroinstruction that is implemented in microcode, the instruction translator transfers control to a microsequencer, which fetches the microcode microinstructions from the microcode memory and dispatches them to execution units for execution. The microinstruction set includes instructions that update the architecturally-visible registers of the architecture in order to implement the macroinstructions. In particular, the microinstruction set includes instructions that update the architecturally-visible register that holds the condition code flags, such as the x86 EFLAGS register.

The present inventors have recognized that there are times when the microcode needs to include conditional instructions, such as conditional branch or conditional move instructions, that conditionally execute based on the results of arithmetic and logical instructions. For example, a microcode routine that implements a floating-point macroinstruction may include an arithmetic or logical microinstruction that generates an intermediate result followed by a conditional instruction that wants to know whether the intermediate result generated a carry or an overflow or a zero value or a negative or positive value, for example. However, the microcode cannot change the architectural condition code flags register unless the architecture specifies that the microcode-implemented macroinstruction updates the architectural condition code flags register, which is not true for many instructions of the x86 architecture, for example. For another example, a microcode exception handler may need to include an arithmetic or logical microinstruction that generates a result followed by a conditional instruction that wants to know a characteristic of the result such as those typically indicated by condition codes; however, the exception handler is not allowed by the architecture to update the condition code flags register of the architecture.

Therefore, what is needed is a microarchitecturally efficient means for the microinstructions of the microarchitecture instruction set to affect and examine condition code-like characteristics, without affecting the condition code flags of the architectural condition code flags register.

BRIEF SUMMARY OF INVENTION

In one aspect, the present invention includes a microprocessor having a microarchitectural instruction set. The microprocessor includes a first register, having a plurality of condition code flags, wherein the first register is an architectural register of the microprocessor. The microprocessor also includes a second register, having the plurality of condition code flags of the first register, wherein the second register is a non-architectural register of the microprocessor. The microprocessor also includes a first instruction of the microarchitectural instruction set. The first instruction instructs the microprocessor to update the plurality of condition code flags based on a result of the first instruction. The first instruction includes a field for indicating whether to update the plurality of condition code flags of the first register or of the second register. The microprocessor also includes a second instruction of the microarchitectural instruction set. The second instruction instructs the microprocessor to conditionally perform an operation based on one of the plurality of condition code flags. The second instruction includes a field for indicating whether to use the one of the plurality of condition code flags of the first register or of the second register to determine whether to perform the operation.

In another aspect, the present invention includes a method for processing conditional instructions within a microprocessor based on condition code flags, the microprocessor having a microarchitectural instruction set. The method includes processing a first instruction of the microarchitectural instruction set, wherein the first instruction instructs the microprocessor to update a plurality of condition code flags based on a result of the first instruction, wherein the first instruction includes a field for indicating whether to update the plurality of condition code flags of a first register or of a second register, wherein the first register is an architectural register of the microprocessor, wherein the second register is a non-architectural register of the microprocessor. The method also includes processing a second instruction of the microarchitectural instruction set, wherein the second instruction instructs the microprocessor to conditionally perform an operation based on one of the plurality of condition code flags, wherein the second instruction includes a field for indicating whether to use the one of the plurality of condition code flags of the first register or of the second register to determine whether to perform the operation.

In yet another aspect, the present invention includes a microprocessor. The microprocessor includes first and second architectural registers, each having a plurality of condition code flags. The microprocessor also includes a first instruction of the instruction set architecture of the microprocessor. The first instruction instructs the microprocessor to update the plurality of condition code flags based on a result of the first instruction. The first instruction includes a field for indicating whether to update the plurality of condition code flags of the first register or of the second register. The microprocessor also includes a second instruction of the instruction set architecture of the microprocessor. The second instruction instructs the microprocessor to conditionally execute based on one of the plurality of condition code flags. The second instruction includes a field for indicating whether to conditionally execute based on one of the plurality of condition code flags of the first register or of the second register.

In yet another aspect, the present invention includes a method for processing conditional instructions within a microprocessor based on condition code flags, the microprocessor having an instruction set architecture. The method includes processing a first instruction of the instruction set architecture of the microprocessor, wherein the first instruction instructs the microprocessor to update a plurality of condition code flags based on a result of the first instruction, wherein the first instruction includes a field for indicating whether to update the plurality of condition code flags of a first architectural register or of a second architectural register of the microprocessor. The method also includes processing a second instruction of the instruction set architecture of the microprocessor, wherein the second instruction instructs the microprocessor to conditionally execute based on one of the plurality of condition code flags, wherein the second instruction includes a field for indicating whether to conditionally execute based on one of the plurality of condition code flags of the first architectural register or of the architectural second register.

An advantage of adding an alternate, non-architectural condition code flags register (such as the GFLAGS register described herein) and adding a bit (such as the G bit described herein) to the instruction format to specify the alternate condition code flags register to the microarchitecture are that programs that want to conditionally execute using condition code flags may do so without having to save and restore the architectural condition code flags register (such as the EFLAGS register described herein) value. Prior to the inclusion of the GFLAGS register and the G bit to the microarchitecture, microcode would have to save the EFLAGS register value, use the EFLAGS, and then restore the EFLAGS register from the saved value. This is inefficient both from a speed of execution standpoint and from a code size standpoint and from the standpoint of writing bug free code. Another advantage is that it is a relatively minor impact on the instruction format to add the G bit compared to adding a whole new set of instructions to accomplish the same functionality. Finally, the time associated with developing and debugging the addition of the G bit and GFLAGS to the existing processor versus adding a whole new set of instructions to the microinstruction set to accomplish the same functionality is significantly less.

DETAILED DESCRIPTION OF THE INVENTION

Figure 1:
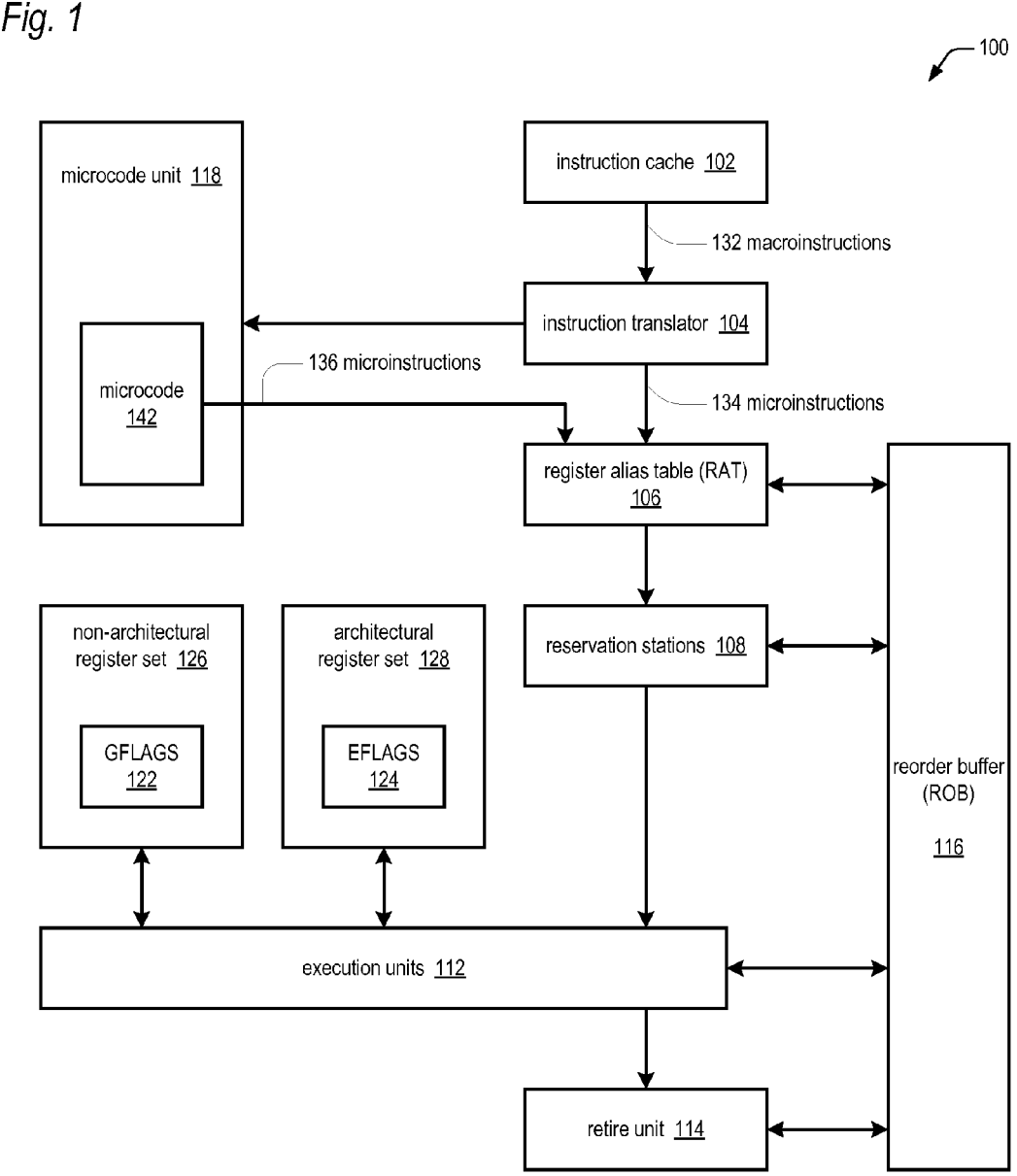
FIG. 1 is a block diagram illustrating a microprocessor according to the present invention.

In one embodiment, the present invention adds a new register, the GFLAGS register (122 of FIG. 1), to the microarchitecture which includes the same condition code flags (402 through 414 of FIG. 4) as the EFLAGS register (124 of FIG. 1), but that is not architecturally visible; rather, it is only visible to the microarchitecture instruction set. Additionally, the present invention adds a bit, the G bit (208 of FIG. 2), to the microinstruction format that specifies to write or read the GFLAGS register 122 rather than the EFLAGS register 124. This enables the instructions of the instruction set to use the contents of the registers of the processor (126 and 128 of FIG. 1) as input operands and see what the results would have been on the EFLAGS register 124 without actually updating the EFLAGS register 124. For example, a conditional branch (Jcc) and a conditional move (MOVcc) can be conditioned off of GFLAGS 122, rather than EFLAGS 124. For another example, an instruction that generates a result, such as an ADD or SHIFT instruction, can specify (via the G bit 208) to update the condition code flags of the GFLAGS register 122 based on the result rather than updating the condition code flags of the EFLAGS register 124.

Referring now to FIG. 1, a block diagram illustrating a microprocessor 100 according to the present invention is shown. The microprocessor 100 includes an instruction cache 102 that caches program instructions, also referred to herein as macroinstructions 132. The instruction cache 102 provides the macroinstructions 132 to an instruction translator 104. The instruction translator 104 translates most of the macroinstructions 132 into microinstructions 134. However, the instruction translator 104 is configured to know that some of the macroinstructions 132 are implemented in microcode 142 of a microcode unit 118 of the microprocessor 100. When the instruction translator 104 encounters a macroinstruction 132 that is implemented in microcode 142, the instruction translator 104 transfers control to a microsequencer (not shown) of the microcode unit 118, which fetches microinstructions 136 of the microcode 142 from a microcode memory (not shown) of the microcode unit 118 and dispatches the microinstructions 136 for execution.

A register alias table (RAT) 106, also referred to herein as a dependency generation unit 106, receives both the translated microinstructions 134 from the instruction translator 104 and the microcode 142 microinstructions 136 from the microcode unit 118 and generates dependencies of the microinstructions 134/136. In one embodiment, the microprocessor 100 is an out-of-order execution microprocessor, and the RAT 106 is the last portion of the microprocessor 100 pipeline that receives instructions in program order. The RAT 106 receives both the translated microinstructions 134 from the instruction translator 104 and the microcode 142 microinstructions 136 from the microcode unit 118 in program order and determines the dependencies of each of the microinstructions 134/136 on other unretired instructions in the microprocessor 100. In particular, for each source operand, which may be the GFLAGS register 122 or the EFLAGS register 124, the RAT 106 generates a dependency, if any, on the newest unretired microinstruction 134/136 that is older than the microinstruction 134/136 and that updates the register in the architectural register set 128 or the non-architectural register set 126 that the microinstruction 134/136 specifies, either explicitly in its operand specifier fields (204 of FIG. 2) or implicitly via its opcode field (202 of FIG. 2) as the provider of the source operand. The RAT 106 stores register renaming information associated with each unretired instruction in the microprocessor 100. The register renaming information incorporates the program order of the instructions, which is used by a reorder buffer (ROB) 116 to retire the instructions in program order. The RAT 106 allocates an entry in the ROB 116 for each instruction before dispatching it to the reservation stations 108. The ROB 116 is coupled to the RAT 106, the reservation stations 108, execution units 112, and a retire unit 114.

The reservation stations 108 receive microinstructions 134/136 from the RAT 106 and issue the microinstructions 134/136 to the execution units 112 as their source operands become available based on the dependency information generated by the RAT 106 and as the execution units 112 become available. That is, the reservation station 108 waits to issue the microinstruction 134/136 until an execution unit 112 of the type that is capable of executing the microinstruction 134/136 is available; additionally, the reservation station 108 waits to issue the microinstruction 134/136 until the older instruction specified by the dependency for each source operand, which may be the GFLAGS register 122 or the EFLAGS register 124, has made its result available to the microinstruction 134/136. In one embodiment, the older instruction may make its result available in one of three ways: by updating the architectural register set 128 or non-architectural register set 126; by writing its result to the ROB 116, which provides the result; or via forwarding buses that provide the result from the output of the execution units 112 back to the input of the relevant execution unit 112.

Figure 3:
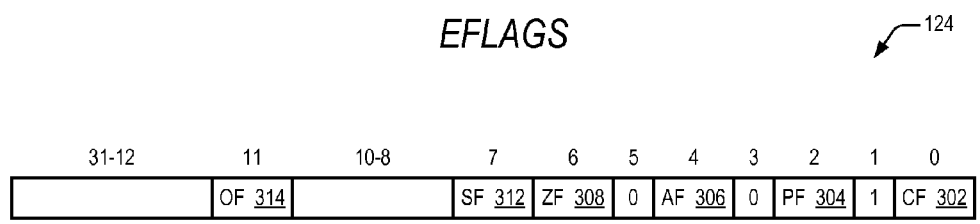
FIG. 3 is a related art block diagram illustrating condition code flags of an x86 architecture EFLAGS register.
Figure 4:
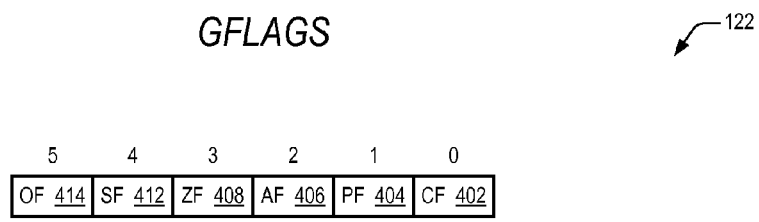
FIG. 4 is a block diagram illustrating condition code flags of the GFLAGS register of FIG. 1 according to the present invention.

The microprocessor 100 also includes an architectural register set 128 and a non-architectural register set 126 that provide source operands to the execution units 112. In particular, according to the embodiment of FIG. 1, the architectural register set 128 includes an x86 architecture EFLAGS register 124, which is shown in more detail in the block diagram of the related art FIG. 3. The EFLAGS register 124 of FIG. 3 contains the Carry Flag (CF) 302, Parity Flag (PF) 304, Auxiliary Carry Flag (AF) 306, Zero Flag (ZF) 308, Sign Flag (SF) 312, and Overflow Flag (OF) 314 mentioned above. Furthermore, the non-architectural register set 126 includes a GFLAGS register 122, which is shown in more detail in the block diagram of FIG. 4. The GFLAGS register 122 of FIG. 4 contains the Carry Flag (CF) 402, Parity Flag (PF) 404, Auxiliary Carry Flag (AF) 406, Zero Flag (ZF) 408, Sign Flag (SF) 412, and Overflow Flag (OF) 414 corresponding to like-named flags of the EFLAGS register 124. In the embodiment of FIG. 4, the condition code flags are in different bit positions within the GFLAGS register 122 than the condition code flags are within the EFLAGS register 124, as shown.

The retire unit 114 retires microinstructions 134/136 in program order as identified by their order in the ROB 116. In particular, the retire unit 114 writes the result of the microinstruction 134/136 to the architectural state of the microprocessor 100, such as to the architectural register set 128 or the non-architectural register set 126, and in particular to the GFLAGS register 122 or the EFLAGS register 124. The retire unit 114 may write the result of the microinstruction 134/136 to the architectural state of the microprocessor 100 either from the ROB 116 or directly from the execution units 112.

In one embodiment, the following elements of the microprocessor 100 have been modified relative to a previous microprocessor. First, as mentioned above, the GFLAGS register 122 of FIG. 1 has been added to the microarchitecture, and the G bit 208 of FIG. 2 has been added to the microinstruction format. Second, the RAT 106 has been modified to generate GFLAGS register 122 dependencies as well as EFLAGS register 124 dependencies. Third, the reservation stations 108 have been modified to recognize GFLAGS register 122 dependencies. Fourth, the execution units 112 have been modified to take an input operand from GFLAGS register 122 rather than the EFLAGS register 124 if the G bit 208 is set rather than the E bit 206. Fifth, the retire unit 114 is modified to update the GFLAGS register 122, rather than EFLAGS register 124, if the G bit 208 is set. Making the above modifications enables the instructions of the microinstruction set to use the registers of the microprocessor 100 as input operands and see what the results would have been on the EFLAGS register 124 without actually updating the EFLAGS register 124. For example, a conditional branch (Jcc) and a conditional move (MOVcc) can be conditioned off of the condition code flags in the GFLAGS register 122. Furthermore, the microcode can look at the GFLAGS register 122 condition code flags by moving the contents of the GFLAGS register 122 into another register, if desired.

In one embodiment, the architecture of the microprocessor 100 is an IA-32 macroarchitecture (also referred to as the x86 architecture). A microprocessor has an IA-32 macroarchitecture if it can correctly execute a majority of the application programs that are designed to be executed on an IA-32 microprocessor. An application program is correctly executed if its expected results are obtained. However, other embodiments are contemplated in which the macroarchitecture of the microprocessor is other than the x86 macroarchitecture, yet still incorporate an alternate condition code flags register in addition to the architectural condition code flags register, and that adds a bit to the instruction format to instruct the microprocessor 100 to read/write the alternate condition code flags register rather than the architectural condition code flags register.

Figure 2:
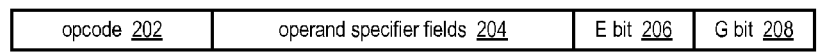
FIG. 2 is a block diagram illustrating a format of the microinstructions of the microprocessor of FIG. 1 according to the present invention.

Referring now to FIG. 2, a block diagram illustrating a format of the microinstructions 134/136 of the microprocessor 100 of FIG. 1 according to the present invention is shown. The instruction format includes an opcode field 202 that includes an opcode that specifies the operation, or operations, the microprocessor 100 is instructed to perform by the instruction 134/136. In particular, some opcodes instruct the microprocessor 100 to conditionally perform the operation depending upon the value of a condition code flag specified by the microinstruction 134/136 of the GFLAGS register 122 or the EFLAGS register 124. That is, if the specified condition code flag has a value that satisfies the condition specified by the opcode, then the microprocessor 100 performs the specified operation; otherwise, the microprocessor 100 does not perform the specified operation. For example, if the zero flag (ZF) 308/408 is clear, then the microprocessor 100 will perform the operation of moving the bytes specified by a MOVNZ (move if not zero) instruction; otherwise, the microprocessor 100 will not perform the operation of moving the specified bytes.

The instruction format also includes one or more operand specifier fields 204 that specify the source of the source and destination operands of the instruction 134/136, such as registers of the architectural register set 128 and the non-architectural register set 126. The instruction format also includes an E bit 206 that, if set, instructs the microprocessor 100 to read or update (depending upon the opcode 202) the condition code flags of the EFLAGS register 124 based on the result of the instruction. The instruction format also includes a G bit 208 that, if set, instructs the microprocessor 100 to read or update (depending upon the opcode 202) the condition code flags of the GFLAGS register 122 based on the result of the instruction.

Although thus far embodiments have been described primarily related to microcode 142 that uses the GFLAGS register 122, in other embodiments the instruction translator 104 generates microinstructions 134 that use the GFLAGS register 122. For example, the x86 LOOP and JCXZ instructions branch based on the value of the x86 ECX register. Since the x86 architecture specifies that these instructions do not modify the EFLAGS register 124, the instruction translator 104 uses the GFLAGS register 122 as shown in the two translated sequences of Table 1 and Table 2 below. Table 1 illustrates a sequence of two microinstructions generated by the instruction translator 104 in response to translating an x86 LOOP macroinstruction. Table 2 illustrates a sequence of two microinstructions generated by the instruction translator 104 in response to translating an x86 JCXZ macroinstruction. In the tables, the G bit 208 is set as indicated by the ".G" in the microarchitectural assembly language instructions.

TABLE 1

LOOP:
(1) xSub.G    ECX, ECX, 1
(2) xBNZ.G    target_address

In line (1), the microinstruction subtracts one (1) from the ECX register and places the result in the ECX register (i.e., decrements the ECX register by 1). Additionally, the microinstruction of line (1) updates the GFLAGS register 122 condition code flags based on the result.

In line (2), the microinstruction conditionally branches to the specified target address based on whether the ZF condition code flag 408 of the GFLAGS register 122 of FIG. 4 is set, i.e., it branches to the target address if ZF 408 is set and does not branch if ZF 408 is clear.

TABLE 2

JCXZ:
(3) xOr.G    Temp, ECX, 0
(4) xBZ.G    target_address

In line (3), the microinstruction exclusive-ORs zero (0) with the ECX register and places the result in a temporary register. Additionally, the microinstruction of line (3) updates the GFLAGS register 122 condition code flags based on the result.

In line (4), the microinstruction conditionally branches to the specified target address based on whether the ZF condition code flag 408 of the GFLAGS register 122 of FIG. 4 is clear, i.e., it branches to the target address if ZF 408 is clear and does not branch if ZF 408 is set.

Figure 5:
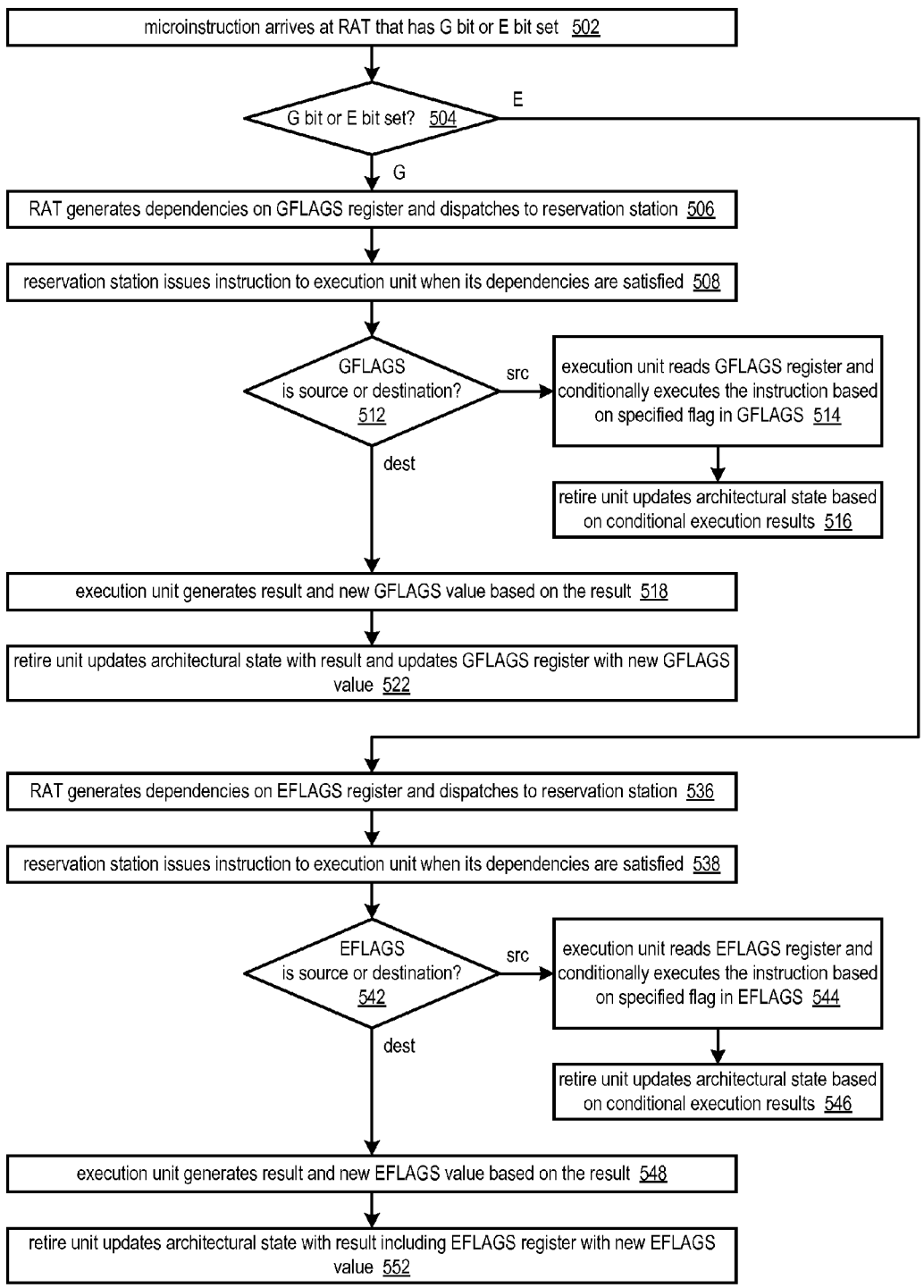
FIG. 5 is a block diagram illustrating a flowchart describing operation of the microprocessor of FIG. 1 according to the present invention.

Referring now to FIG. 5, a block diagram illustrating a flowchart describing operation of the microprocessor 100 of FIG. 1 according to the present invention is shown. Flow begins at block 502.

At block 502, a microinstruction 134/136 arrives at the RAT 106 that has either the G bit 208 or the E bit 206 set. Flow proceeds to decision block 504.

At decision block 504, the RAT 106 determines whether the G bit 208 or the E bit 206 is set. If the E bit 206 is set, flow proceeds to block 536; whereas, if the G bit 208 is set, flow proceeds to block 506.

At block 506, the RAT 106 generates dependencies for the microinstruction 134/136, including any dependencies related the GFLAGS register 122, and dispatches the microinstruction 134/136 to a reservation station 108. Flow proceeds to block 508.

At block 508, the reservation station 108 issues the microinstruction 134/136 to the appropriate execution unit 112 when its dependencies are satisfied and the appropriate execution unit 112 is available. Flow proceeds to decision block 512.

At decision block 512, the execution unit 112 determines whether the GFLAGS register 122 supplies a source or destination of the microinstruction 134/136. If the GFLAGS register 122 is a destination of the microinstruction 134/136 based on the result of the microinstruction 134/136, flow proceeds to block 518; whereas, if the GFLAGS register 122 is the source of an operand of the microinstruction 134/136, which means the microinstruction 134/136 is a conditional instruction based on one of the condition code flags in the GFLAGS register 122, flow proceeds to block 514.

At block 514, the execution unit 112 controls its operand input muxes (not shown) to receive the condition code flags from the GFLAGS register 122 and conditionally performs the operation specified by the conditional microinstruction 134/136 based on the value of the condition code flag in the GFLAGS register 122 specified by the conditional microinstruction 134/136. Flow proceeds to block 516.

At block 516, the retire unit 114 updates the architectural state of the microprocessor 100, as appropriate, depending upon whether the execution unit 112 performed the operation specified by the conditional microinstruction 134/136. Flow ends at block 516.

At block 518, the execution unit 112 generates the result of the microinstruction 134/136 and also generates new condition code flag values for the GFLAGS register 122 based on the result. Flow proceeds to block 522.

At block 522, the retire unit 114 updates the architectural state of the microprocessor 100 with the result of the microinstruction 134/136, which includes updating the GFLAGS register 122 with the new condition code flag values generated at block 518. Flow ends at block 522.

At block 536, the RAT 106 generates dependencies for the microinstruction 134/136, including any dependencies related the EFLAGS register 124, and dispatches the microinstruction 134/136 to a reservation station 108. Flow proceeds to block 538.

At block 538, the reservation station 108 issues the microinstruction 134/136 to the appropriate execution unit 112 when its dependencies are satisfied and the appropriate execution unit 112 is available. Flow proceeds to decision block 542.

At decision block 542, the execution unit 112 determines whether the EFLAGS register 124 supplies a source or destination of the microinstruction 134/136. If the EFLAGS register 124 is a destination of the microinstruction 134/136 based on the result of the microinstruction 134/136, flow proceeds to block 548; whereas, if the EFLAGS register 124 is the source of an operand of the microinstruction 134/136, which means the microinstruction 134/136 is a conditional instruction based on one of the condition code flags in the EFLAGS register 124, flow proceeds to block 544.

At block 544, the execution unit 112 controls its operand input muxes (not shown) to receive the condition code flags from the EFLAGS register 124 and conditionally performs the operation specified by the conditional microinstruction 134/136 based on the value of the condition code flag in the EFLAGS register 124 specified by the conditional microinstruction 134/136. Flow proceeds to block 546.

At block 546, the retire unit 114 updates the architectural state of the microprocessor 100, as appropriate, depending upon whether the execution unit 112 performed the operation specified by the conditional microinstruction 134/136. Flow ends at block 546.

At block 548, the execution unit 112 generates the result of the microinstruction 134/136 and also generates new condition code flag values for the EFLAGS register 124 based on the result. Flow proceeds to block 552.

At block 552, the retire unit 114 updates the architectural state of the microprocessor 100 with the result of the microinstruction 134/136, which includes updating the EFLAGS register 124 with the new condition code flag values generated at block 548. Flow ends at block 552.

Although embodiments have primarily been described in which the microprocessor 100 is an x86 architecture microprocessor that includes the architectural EFLAGS register 124, the notion of an alternate condition code flags register that is only part of the microarchitecture of the microprocessor and is not part of the architecture of the microprocessor may be incorporated into microprocessors having other architectures.

Figure 6:
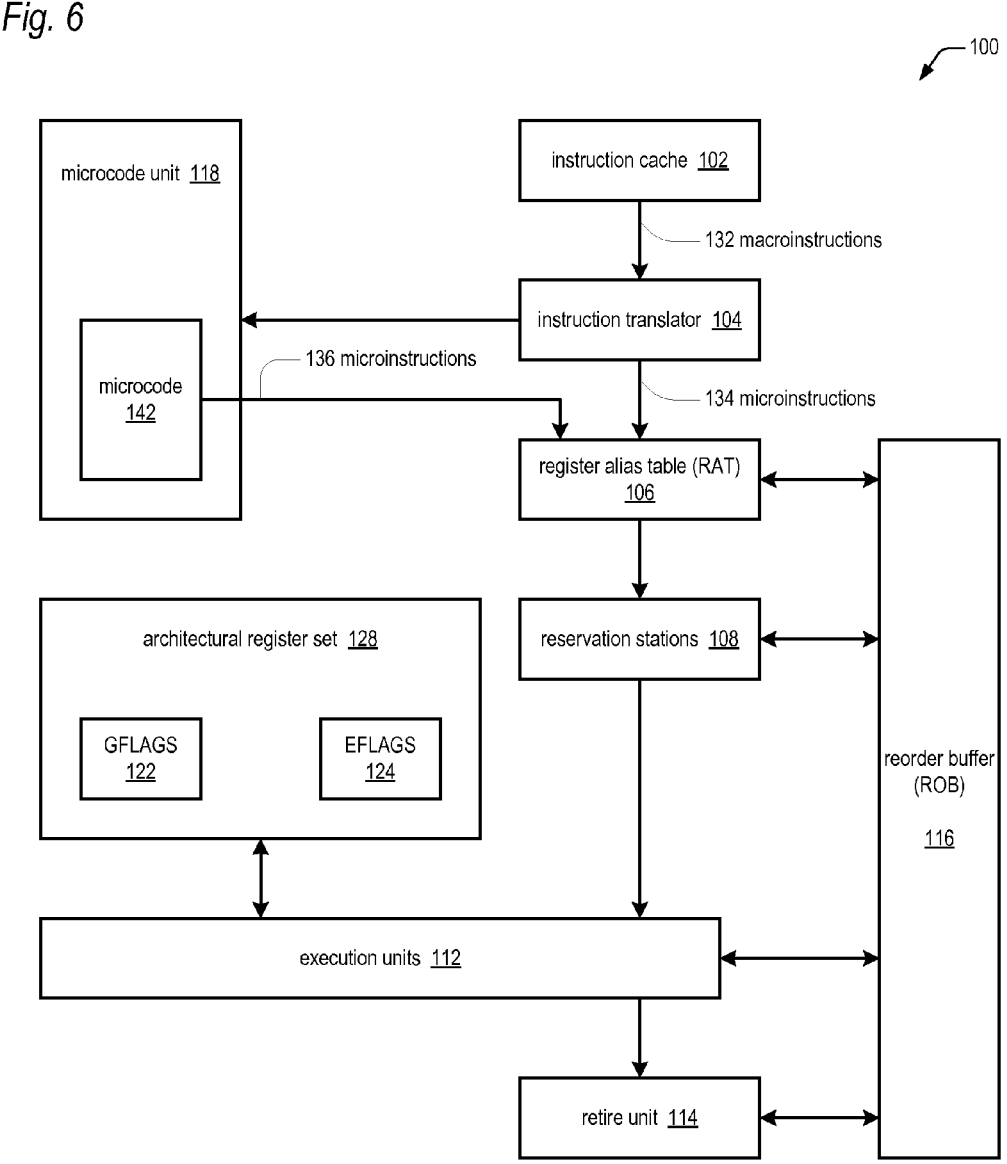
FIG. 6 is a block diagram illustrating a microprocessor according to an alternate embodiment of the present invention.

Furthermore, although embodiments have been described in which the microprocessor includes an alternate condition code flags register that is only part of the microarchitecture of the microprocessor and is not part of the architecture of the microprocessor, other embodiments are contemplated in which the alternate condition code flags register is also a part of the architecture, i.e., visible to the instructions of the architecture. Such an embodiment is shown in FIG. 6, in which the GFLAGS register 122 is part of the architectural register set 128. In the embodiment of FIG. 6, the instruction format of the macroinstructions 132 of the instruction set architecture of the microprocessor 100 include a bit, similar to the G bit 208 of FIG. 2, which indicates whether to update/read the GFLAGS register 122 instead of the EFLAGS register 124.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having a microarchitectural instruction set, the microprocessor comprising:

a first register, having a plurality of condition code flags, wherein the first register is an architectural register of the microprocessor;

a second register, having simultaneously the plurality of condition code flags of the first register, wherein the second register is a non-architectural register of the microprocessor;

a first instruction of the microarchitectural instruction set, wherein the first instruction instructs the microprocessor to update the plurality of condition code flags based on a result of the first instruction, wherein the first instruction includes a field for indicating whether to update the plurality of condition code flags of the first register or of the second register; and a second instruction of the microarchitectural instruction set, wherein the second instruction instructs the microprocessor to conditionally perform an operation based on one of the plurality of condition code flags, wherein the second instruction includes a field for indicating whether to use the one of the plurality of condition code flags of the first register or of the second register to determine whether to perform the operation.

2. The microprocessor of claim 1, wherein the first register comprises an x86 architecture EFLAGS register.

3. The microprocessor of claim 1, wherein the plurality of condition code flags comprises the x86 architecture EFLAGS register carry flag (CF), parity flag (PF), auxiliary carry flag (AF), zero flag (ZF), sign flag (SF), and overflow flag (OF).

4. The microprocessor of claim 1, wherein the microarchitectural instruction set of the microprocessor is distinct from the architectural instruction set of the microprocessor.

5. The microprocessor of claim 1, further comprising:
an execution unit, coupled to the first and second registers, configured to execute the second instruction, wherein the execution unit is configured to receive the plurality of condition code flags from the first register if the field of the second instruction indicates to use the one of the plurality of condition code flags from the first register to determine whether to perform the operation, wherein the execution unit is configured to receive the plurality of condition code flags from the second register if the field of the second instruction indicates to use the one of the plurality of condition code flags from the second register to determine whether to perform the operation.

6. The microprocessor of claim 1, further comprising:
a retire unit, coupled to the first and second registers, configured to retire the first instruction, wherein the retire unit is configured to update the plurality of condition code flags in the first register if the field of the first instruction indicates to update the plurality of condition code flags of the first register, wherein the retire unit is configured to update the plurality of condition code flags in the second register if the field of the first instruction indicates to update the plurality of condition code flags of the second register.

7. The microprocessor of claim 1, further comprising:
a dependency generation unit, configured to generate dependencies of the second instruction upon other instructions, wherein the dependency generation unit is configured to generate dependencies of the second instruction upon a newest unretired instruction that is older than the second instruction and that updates the first register if the field of the second instruction indicates to use the one of the plurality of condition code flags from the first register to determine whether to perform the operation, wherein the dependency generation unit is configured to generate dependencies of the second instruction upon a newest unretired instruction that is older than the second instruction and that updates the second register if the field of the second instruction indicates to use the one of the plurality of condition code flags from the second register to determine whether to perform the operation.

8. The microprocessor of claim 7, further comprising:
an instruction issue unit, coupled to the dependency generation unit, wherein the instruction issue unit is configured to wait to issue the second instruction to an execution unit until the newest unretired instruction that is older than the second instruction has made available to the second instruction its updated value of the plurality of condition code flags of the first register if the field of the second instruction indicates to use the one of the plurality of condition code flags from the first register to determine whether to perform the operation, wherein the instruction issue unit is configured to wait to issue the second instruction to the execution unit until the newest unretired instruction that is older than the second instruction has made available to the second instruction its updated value of the plurality of condition code flags of the second register if the field of the second instruction indicates to use the one of the plurality of condition code flags from the second register to determine whether to perform the operation.

9. The microprocessor of claim 1, wherein the first and second instructions are included in a microcode program of the microprocessor, wherein the microcode program is configured to implement an instruction of the architecture of the microprocessor.

10. The microprocessor of claim 1, further comprising:
an instruction translator, configured to translate an instruction of the architecture of the microprocessor into the first and second instructions.

11. A method for processing conditional instructions within a microprocessor based on condition code flags, the microprocessor having a microarchitectural instruction set, the method comprising:
processing a first instruction of the microarchitectural instruction set, wherein the first instruction instructs the microprocessor to update simultaneously a plurality of condition code flags based on a result of the first instruction, wherein the first instruction includes a field for indicating whether to update the plurality of condition code flags of a first register or of a second register, wherein the first register is an architectural register of the microprocessor, wherein the second register is a non-architectural register of the microprocessor; and
processing a second instruction of the microarchitectural instruction set, wherein the second instruction instructs the microprocessor to conditionally perform an operation based on one of the plurality of condition code flags, wherein the second instruction includes a field for indicating whether to use the one of the plurality of condition code flags of the first register or of the second register to determine whether to perform the operation.

12. The method of claim 11, wherein the first register comprises an x86 architecture EFLAGS register.

13. The method of claim 11, wherein the plurality of condition code flags comprises the x86 architecture EFLAGS register carry flag (CF), parity flag (PF), auxiliary carry flag (AF), zero flag (ZF), sign flag (SF), and overflow flag (OF).

14. The method of claim 11, wherein the microarchitectural instruction set of the microprocessor is distinct from the architectural instruction set of the microprocessor.

15. The method of claim 11, further comprising:
receiving the plurality of condition code flags from the first register if the field of the second instruction indicates to use the one of the plurality of condition code flags from the first register to determine whether to perform the operation; and
receiving the plurality of condition code flags from the second register if the field of the second instruction indicates to use the one of the plurality of condition code flags from the second register to determine whether to perform the operation;
wherein said receiving the plurality of condition code flags is performed by an execution unit of the microprocessor.

16. The method of claim 11, further comprising:
updating the plurality of condition code flags in the first register if the field of the first instruction indicates to update the plurality of condition code flags of the first register; and updating the plurality of condition code flags in the second register if the field of the first instruction indicates to update the plurality of condition code flags of the second register.

17. The method of claim 11, further comprising:
generating dependencies of the second instruction upon a newest unretired instruction that is older than the second instruction and that updates the first register if the field of the second instruction indicates to use the one of the plurality of condition code flags from the first register to determine whether to perform the operation; and
generating dependencies of the second instruction upon a newest unretired instruction that is older than the second instruction and that updates the second register if the field of the second instruction indicates to use the one of the plurality of condition code flags from the second register to determine whether to perform the operation.

18. The method of claim 17, further comprising:
waiting to issue the second instruction to an execution unit until the newest unretired instruction that is older than the second instruction has made available to the second instruction its updated value of the plurality of condition code flags of the first register if the field of the second instruction indicates to use the one of the plurality of condition code flags from the first register to determine whether to perform the operation; and
waiting to issue the second instruction to the execution unit until the newest unretired instruction that is older than the second instruction has made available to the second instruction its updated value of the plurality of condition code flags of the second register if the field of the second instruction indicates to use the one of the plurality of condition code flags from the second register to determine whether to perform the operation.

19. The method of claim 11, wherein the first and second instructions are included in a microcode program of the microprocessor, wherein the microcode program is configured to implement an instruction of the architecture of the microprocessor.

20. The method of claim 11, further comprising:
translating an instruction of the architecture of the microprocessor into the first and second instructions.

21. A microprocessor, comprising:
first and second architectural registers, each having simultaneously a plurality of condition code flags;
a first instruction of the instruction set architecture of the microprocessor, wherein the first instruction instructs the microprocessor to update the plurality of condition code flags based on a result of the first instruction, wherein the first instruction includes a field for indicating whether to update the plurality of condition code flags of the first register or of the second register; and
a second instruction of the instruction set architecture of the microprocessor, wherein the second instruction instructs the microprocessor to conditionally execute based on one of the plurality of condition code flags, wherein the second instruction includes a field for indicating whether to conditionally execute based on one of the plurality of condition code flags of the first register or of the second register.

22. A method for processing conditional instructions within a microprocessor based on condition code flags, the microprocessor having an instruction set architecture, the method comprising:
processing a first instruction of the instruction set architecture of the microprocessor, wherein the first instruction instructs the microprocessor to update simultaneously a plurality of condition code flags based on a result of the first instruction, wherein the first instruction includes a field for indicating whether to update the plurality of condition code flags of a first architectural register or of a second architectural register of the microprocessor; and
processing a second instruction of the instruction set architecture of the microprocessor, wherein the second instruction instructs the microprocessor to conditionally execute based on one of the plurality of condition code flags, wherein the second instruction includes a field for indicating whether to conditionally execute based on one of the plurality of condition code flags of the first architectural register or of the architectural second register.

\* \* \* \* \*